(12) United States Patent
Noest et al.

(10) Patent No.: US 12,400,348 B2
(45) Date of Patent: Aug. 26, 2025

(54) RECOGNITION OF 3D OBJECTS

(71) Applicant: The Face Recognition Company, Gloucestershire (GB)

(72) Inventors: Tim Noest, Gloucestershire (GB); Nicholas Pears, York (GB)

(73) Assignee: THE FACE RECOGNITION COMPANY LTD, Cirencester (GB)

( * ) Notice: Subject to any disclaimer, the term of this patent is extended or adjusted under 35 U.S.C. 154(b) by 696 days.

(21) Appl. No.: 17/252,356

(22) PCT Filed: Jun. 17, 2019

(86) PCT No.: PCT/GB2019/051679
§ 371 (c)(1),
(2) Date: Dec. 15, 2020

(87) PCT Pub. No.: WO2019/239158
PCT Pub. Date: Dec. 19, 2019

(65) Prior Publication Data
US 2021/0264132 A1     Aug. 26, 2021

(30) Foreign Application Priority Data
Jun. 15, 2018 (GB) .................................... 1809855

(51) Int. Cl.
*G06T 7/593*     (2017.01)
*G06V 20/64*     (2022.01)
(Continued)

(52) U.S. Cl.
CPC ............ *G06T 7/593* (2017.01); *G06V 20/647* (2022.01); *G06V 40/10* (2022.01); *G06V 40/166* (2022.01);
(Continued)

(58) Field of Classification Search
CPC . G06T 7/593; G06T 7/97; G06T 2207/30244; G06V 20/647; G06V 40/10;
(Continued)

(56) References Cited

U.S. PATENT DOCUMENTS 7,551,755 B1    6/2009    Steinberg et al.
8,860,788 B2    10/2014   Austin et al.
(Continued)

FOREIGN PATENT DOCUMENTS

| | | |
|---|---|---|
| CN | 107862240 A | 3/2018 |
| CN | 108648310 A | 10/2018 |
| CN | 104573637 B | 11/2020 |

OTHER PUBLICATIONS

International Search Report of Nov. 29, 2019 for PCT/GB2019/051680.
(Continued)

*Primary Examiner* — Stephen P Coleman
(74) *Attorney, Agent, or Firm* — GrayRobinson, P.A.

(57) ABSTRACT

3D objects in the form of human faces are recognised at or adjacent an entrance to a building. Cameras are spaced horizontally from one another in an array to provide multiple viewpoints of a common scene with overlapping fields of view. For each of the cameras, a sequence of images of a face is generated and each of those images is normalised to a canonical view. One or more best normalised image for each camera is selected and feature data is extracted from the selected image. A recognition processor compares the extracted feature data of each selected image with stored, corresponding feature data of known 3D objects. A recognition result is output when the extracted feature data of at least one of the selected images corresponds to stored, corresponding feature data of at least one of the known 3D objects.

17 Claims, 2 Drawing Sheets

(51) Int. Cl.
*G06V 40/10* (2022.01)
*G06V 40/16* (2022.01)
*H04N 23/90* (2023.01)

(52) U.S. Cl.
CPC .......... *G06V 40/168* (2022.01); *G06V 40/172* (2022.01); *H04N 23/90* (2023.01)

(58) Field of Classification Search
CPC .. G06V 40/166; G06V 40/168; G06V 40/172; G06V 2201/12; G06V 40/161; G06V 10/147; G06V 10/16; G06V 10/247; H04N 23/90
USPC ........................................................ 382/103
See application file for complete search history.

(56) References Cited

U.S. PATENT DOCUMENTS

| | | | |
|---|---|---|---|
| 2004/0240711 A1* | 12/2004 | Hamza | G06V 40/172 382/118 |
| 2006/0062548 A1 | 3/2006 | Low | |
| 2016/0063296 A1* | 3/2016 | Du | G06V 40/1347 382/124 |

OTHER PUBLICATIONS

International Search Report of Oct. 30, 2019 for PCT/GB2019/051679.

Search Report of Dec. 11, 2018 for Application No. GB1809855.8.
Search Report of Dec. 11, 2018 for Application No. GB1809857.4.
Shakhnarovich et al.; "Integrated Face and Gait Recognition From Multiple Views"; IEEE Conference on Computer Vision and Pattern Recognition; pp. 439-446; 2001.
Binglong Xie et al: "On Channel Reliability Measure Training for Multi-Camera Face Recognition", Applications of Computer Vision, 2007. WACV '07. IEEE Workshop On, IEEE, PI, Feb. 1, 2007 (Feb. 1, 2007), pp. 41-41, XP031055150, ISBN: 978-0-7695-2794-9.
Blanz V et al: "Face Recognition Based on Frontal Views Generated from Non-Frontal Images", Proceedings / 2005 IEEE Computer Society Conference On Computer Vision and Pattern Recognition, CVPR 2005 : [Jun. 20-25, 2005, San Diego, CA], IEEE, Piscataway, NJ, USA, vol. 2, Jun. 20, 2005 (Jun. 20, 2005), pp. 454-461, XP010817632, DOI: 10.1109/CVPR.2005.150ISBN: 978-0-7695-2372-9.
Cheung Kin-Wang et al: "Synthesizing Frontal Faces on Calibrated Stereo Cameras for Face Recognition", Jun. 2, 2009 (Jun. 2, 2009), SAT 2015 18th International Conference, Austin, TX, USA, Sep. 24-27, 2015; [Lecture Notes in Computer Science; Lect.Notes Computer], Springer, Berlin, Heidelberg, pp. 347-356, XP047443994, ISBN: 978-3-540-74549-5.
Le An et al: "Face recognition in multi-camera surveillance videos using Dynamic Bayesian Network", Distributed Smart Cameras (ICDSC), 2012 Sixth International Conference On, IEEE, Oct. 30, 2012 (Oct. 30, 2012), pp. 1-6, XP032336163, ISBN: 978-1-4503-1772-6.

* cited by examiner

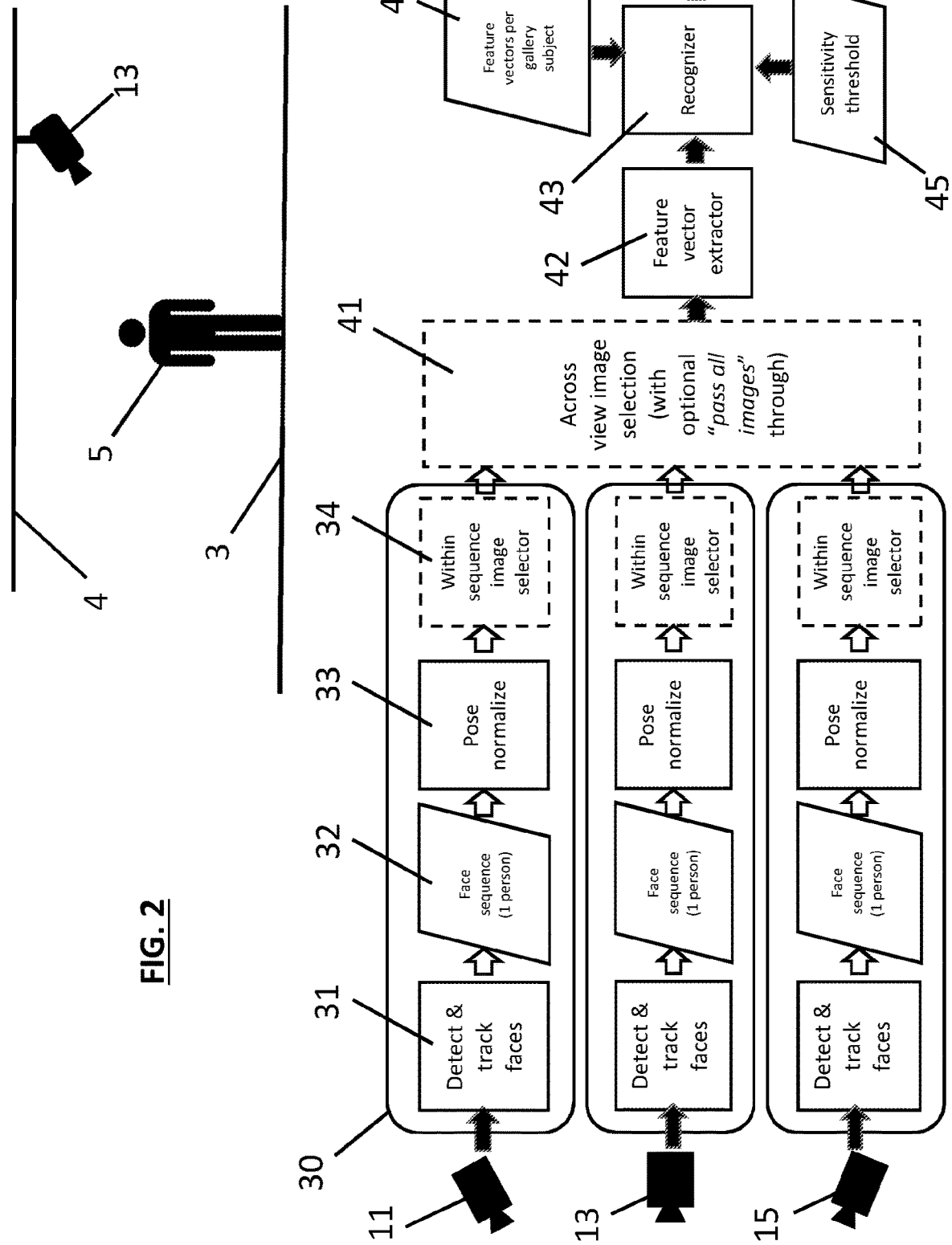

RECOGNITION OF 3D OBJECTS

CROSS-REFERENCE TO RELATED APPLICATIONS

This is the US national stage application of International Application No. PCT/GB2019/051679, filed Jun. 17, 2019, which claims the benefit of priority from GB Application No. 1809855.8, filed Jun. 15, 2018. The entire contents of these prior applications are incorporated by reference.

FIELD

The present invention relates to the recognition of 3D objects and is concerned particularly, although not exclusively, with the recognition of human faces or parts thereof.

BACKGROUND

In this specification, a '2D camera' is a camera that produces a 2D image and a '3D camera' is a camera (or camera system) that produces a 3D image.

The generation of 3D images by combining images from 2D cameras is well known. Recognising a human face from a cooperative subject facing in a given direction can readily be achieved—as may happen in a security situation where the subject wishes to gain access. However, recognising a human face from a subject that is not primed to cooperate can be much more difficult.

CN104573637 discloses a multi-camera-based vehicle license plate recognition method. Multiple cameras take images of the license plates of vehicles, e.g. where the vehicles are travelling side-by-side in multiple lanes. The images are compared to arrive at a best recognition result. This is essentially a 2D image process. License plates are generally flat and any image of them that is taken off-axis can readily be processed to give an on-axis view to improve recognition. However, recognising 3D objects such as a human face is much more challenging. When taken off-axis, one part of the face (e.g. the nose) can occlude another part. With images of a human face taken from different viewpoints, it is not possible to mathematically map one view to another, whereas this can be done with anything completely flat, such as a license plate.

BRIEF SUMMARY

Preferred embodiments of the present invention aim to provide improved systems and methods for recognising 3D objects.

According to one aspect of the present invention, there is provided a method of recognising a 3D object at a scene, comprising the steps of:
  providing an array of cameras that are spaced horizontally from one another such that the cameras provide multiple viewpoints of the scene with overlapping fields of view;
  for each of the cameras, generating a sequence of images of the object, normalising each of those images to a canonical view, selecting one or more best normalised image for that camera and passing the or each selected image to a feature extraction processor;
  by means of the feature extraction processor, extracting feature data from each of the selected images;
  by means of a recognition processor, comparing the extracted feature data of each of the selected images with stored, corresponding feature data of known 3D objects; and
  outputting a recognition result when the extracted feature data of at least one of the selected images corresponds to stored, corresponding feature data of at least one of the known 3D objects.

Preferably, an image is passed to the feature extraction processor only if that image is better than a predetermined threshold.

Preferably, the method comprises the further step of receiving all selected images from all of the cameras and carrying out a further selection from those images to select one or more best normalised image that is passed to the feature extraction processor.

The cameras may be disposed at one side of the scene.

The cameras may surround the scene.

The cameras may be arranged in an arc as seen in plan view.

Preferably, wherein the scene has a floor and the camera apertures are located at a height above the floor that is in the range 1.5 to 2.5 metres or 3 to 4 metres.

Preferably, the scene has a floor and the camera apertures are located at a height above the floor that is less than 5 metres.

Preferably, the maximum distance between any two cameras of the array is at least 2 metres.

Preferably, the array of cameras comprises at least three, four or five cameras.

Preferably, the scene is at a location where people travel in a common direction.

Preferably, the 3D object to be recognised is a human subject.

Preferably, the 3D object to be recognised is a human face.

Preferably, said canonical view is a frontal view.

Preferably, the cameras are 2D cameras.

The step of normalising images to a canonical view may comprise synthesising a canonical viewpoint image from images of different viewpoints from different ones of the cameras.

The invention extends to a system for use in a method according to any of the preceding aspects of the invention, the system including the array of cameras that are spaced from one another such that the cameras provide multiple viewpoints of the scene with overlapping fields of view; for each of the cameras, means for generating a sequence of images of the object, normalising each of those images to a canonical view and selecting at least one best normalised image for that camera; the feature extraction processor; the recognition processor; a data store that stores said corresponding feature data of known 3D objects; and an output device to output said recognition result: the system being configured to perform a method according to any of the preceding aspects of the invention.

BRIEF DESCRIPTION OF THE DRAWINGS

For a better understanding of the invention, and to show how embodiments of the same may be carried into effect, reference will now be made, by way of example, to the accompanying diagrammatic drawings, in which:

FIG. 2 shows one of the 2D cameras of FIG. 1 in side elevation, mounted above a human subject; and FIG. 3 is a block diagram of the 3D object recognition system.

In the figures, like references denote like or corresponding parts.

DETAILED DESCRIPTION OF EXAMPLE EMBODIMENTS

Figure 1:
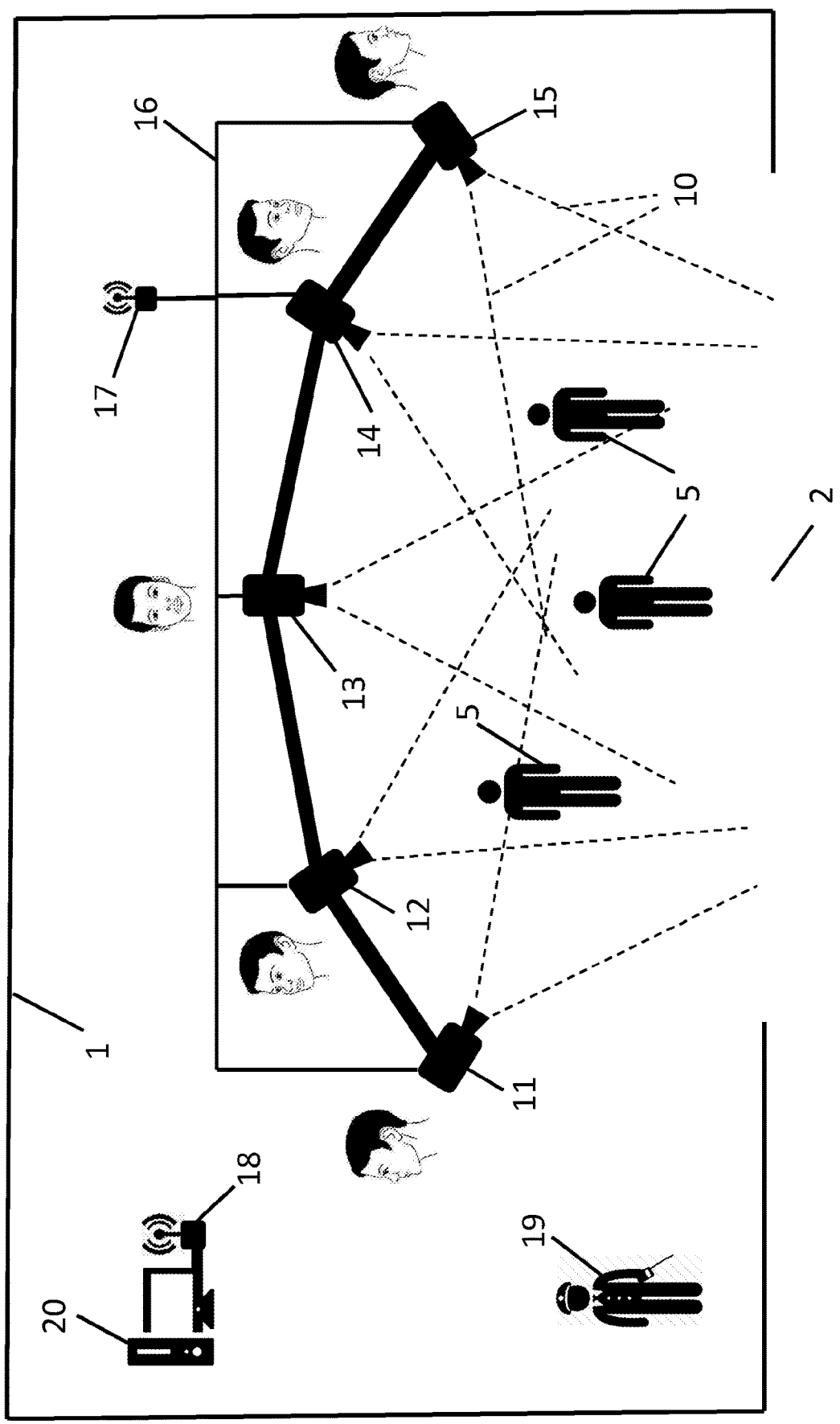
FIG. 1 shows in plan view part of a system for recognising 3D objects, comprising an array of 2D cameras with overlapping fields of view.

It is to be understood that the various features that are described in the following and/or illustrated in the drawings are preferred but not essential. Combinations of features described and/or illustrated are not considered to be the only possible combinations. Unless stated to the contrary, individual features may be omitted, varied or combined in different combinations, where practical.

The 3D object recognition system that is illustrated in FIGS. 1 to 3 is intended to recognise human faces at or adjacent an entrance 2 to a building 1. An array of five cameras 11-15 is arranged in an arc such that all of the cameras are directed generally towards the building entrance 2. The cameras 11-15 are suspended from a roof 4 of the building 1, such that their apertures (or lenses) are at a height of about 2.5 m above the level of a floor 3. Thus, all of the cameras 11-15 face generally towards people 5 entering the building 1 and slightly downwardly. If the cameras 11-15 are located above an area of the floor 3 where people 5 would not normally walk, the camera apertures may be at a somewhat lower level—e.g. about 2 m above the level of floor 3. The camera apertures are preferably no higher than 5 m above the level of floor 3. In this example, all cameras 11-15 are at the same height. However, they could be at differing heights, which could be helpful in viewing subjects of different heights and or with various tilts of their faces. The cameras 11-15 may be spaced at least 0.5 m apart from one another, measured horizontally—i.e. the horizontal component of their mutual spacing.

The cameras 11-15 are interconnected by a cable 16 that also connects to a Wi-Fi device 17, which in turn connects wirelessly with a Wi-Fi device 18 of a PC server that is located in the building 1. Thus, all of the cameras 11-15 are operatively connected to the PC server 20. If desired, each of the cameras 11-15 may alternatively have its own independent Wi-Fi device such as 17. The PC server 20 provides processing of images from the cameras 11-15 and may manage data flow through the system.

Each of the cameras 11-15 has a field of view that is indicated by broken lines 10. It will be seen that the fields of view 10 overlap one another to a significant extent. That is, there is sufficient overlap between the fields of view 10 to enable different poses of a person 5 to be captured by the different cameras 11-15. This differs from conventional security camera installations where multiple cameras are aimed at different locations and therefore have fields of view that either don't overlap at all or overlap only slightly, since the objective of such installations is to cover as much floor area as possible.

The total field of view obtained by the sum of the fields of view 10 of the cameras 11-15 may conveniently be referred to as a 'scene' that is viewed by the cameras. In this example, the cameras 11-15 are to one side of the scene. Alternatively, cameras may surround a scene—either fully or mostly.

The maximum distance between any two of the cameras 11-15 is the distance between cameras 11 and 15 and that defines to some extent the size of the scene. In this example, that distance is at least 2 m and, in order to provide sufficient overlap of fields without requiring complex cameras, the distance is no more than 10 m. The maximum distance from any one of the cameras 11-15 to the scene may be about 5 m and is preferably no more than 10, 15 or 20 m.

If a person 5 enters the building 1 in approximately the middle of the entrance 2, walking forward and looking ahead, the centre camera 13 will capture an image of the person's face that is substantially a frontal view. This is usually the ideal view to facilitate facial recognition. The leftmost (as seen) camera 11 captures a left side view of the face and the intermediate camera 12 captures a view between frontal and left side, which we conveniently refer to here as a left three-quarter view. (It will be appreciated that a 'side view' may not be an exact side view and a 'three-quarter view' may not be an exact three-quarter view, depending upon the respective positions of the person 5 with respect to the cameras 11-15.) The rightmost (as seen) camera 15 captures a right side view of the face and the intermediate camera 14 captures a right three-quarter view. The respective facial views as captured by the cameras 11-15 are illustrated diagrammatically in FIG. 1.

In reality, any person 5 entering the building 1 via the entrance 2 may not be exactly in front of the centre camera 13 and may be neither walking nor looking straight ahead. Indeed, it is quite usual for a person entering a building to look to the left and/or to the right to get their bearings. If a person 5 is looking somewhat to the left upon walking through the entrance 2, then cameras 11 and 12 may capture a view that is more frontal than that captured by the centre camera 13. Likewise, if a person 5 is looking somewhat to the right, cameras 14 and 15 may capture views that are more frontal. Additionally, the gaze and/or direction of movement of any person 5 may vary continuously between straight ahead, left and right after the person has entered the building 1. Thus, the viewpoints of the cameras 11-15 towards any given person 5 may be changing continuously.

Reasons for recognising human faces are many and need not be discussed in detail here. The reason may be benign—for example, a store wishing to recognise a loyal customer. The reason may be quite different—for example, store security personnel recognising known shoplifters—or, in many public places these days, recognising known terrorists or other criminals. In many cases, recognition needs to be swift to be of immediate use.

In the illustrated example, any given person 5 entering the building 1 is unlikely to stay for any significant time near the entrance 2. They might do so for various reasons, but it is more likely that they will wish to make their way to their intended destination. This is particularly the case if the person has unlawful intent. Therefore, if the cameras 11-15 are to be useful in recognising people 5, the system of which they are part must operate quickly.

As mentioned above, if a camera views a human face off-axis—that is, other than a straight frontal view—it is likely that some facial features will obscure others. For example, the left side of the face is likely to obscure the right side of the face. The nose is likely to obscure the opposite side of the face from which it is viewed. This is a direct result of the human face being a three-dimensional object. If it were flat (2D), the features would largely be visible when viewed from any angle and there would be considerable scope for processing an image to correct the view to a frontal one.

Techniques are known (and will be known to the skilled reader) for normalising an off-axis 2D view of a 3D human face to approximate to an on-axis, frontal view, typically using detected landmarks. This is known as pose-normalisation and the normalised view may be referred to as a canonical view. However, in order to be effective, the off-axis view to be normalised must not be too far off axis.

The illustrated system enables multiple views to be captured of any given person 5 and for those views to be compared in order to arrive at one or more view that is best suited to recognition. An example of the way in which this may be achieved is now given, with reference to FIG. 3.

In the interests of clarity, FIG. 3 shows just three cameras 11, 13 and 15. However, any desired number of cameras may be employed, along similar lines.

Camera 11 takes continuous images of its field of view. This may be a sequence of still images or it may be a continuous stream that is divided into still frames. The image or frame rate may be in the range 0.5 to 60 per second and preferably 10 to 30 per second—for example, 10 images or frames per second. Processor 31 processes the image A to detect and track a face in the image, generating data 32 that represents a sequence of images of the face. Each of those images is pose-normalised by processor 33, which processes the image to represent it as closely as possible to a frontal view. (If the view just happens to be a good frontal view, there is little or no pose-normalisation to do.) Processor 34 selects the best pose-normalized images from the sequence—typically, the highest quality images, with sufficiently small pose corrections and with good diversity. If the camera 11 provides no image of a selected face that is sufficiently good to be of further use (i.e. it is not better than a predetermined threshold), then processor 34 provides no output.

Processors 31, 33, 34 along with data store 32 are represented as a first processing unit 30. All or some of this unit 30 may be incorporated within the camera 11. Many modern cameras, even those that are relatively inexpensive, possess at least some of the necessary processing ability. Alternatively or additionally, some or all of the functions of processing unit 30 may be provided by the PC server 20.

Cameras 13 and 15 operate in parallel to camera 11, each with their respective first processing unit 30 that operates in a similar manner, to output image data corresponding to the best pose-normalised images (if any) selected by processors 34.

A processor 41 receives all selected images from all of the processors 34 and makes a further selection from them to select the best quality images. Criteria for selecting the best images may be as described above—for example, the highest quality images, with sufficiently small pose corrections and with good diversity (i.e. different from each other according to various metrics).

For each of the images selected by processor 41, facial features (feature vectors) are extracted by a processor 42 and compared by processor 43 to corresponding feature vectors held in a data store 44 that stores the data of a gallery of known 3D subjects. Extracting feature vectors from a facial image is a technique that will be known to the skilled reader and therefore requires no detailed explanation here.

The vector comparison by the processor 43 leads to a feature match score for each selected input image against each of the gallery 3D subjects. The best score and associated 3D gallery object are displayed as output 46, provided that the score exceeds a predefined sensitivity threshold that is adjustable and is stored in data store 45. More than one associated 3D gallery object may be displayed as output 46, if the feature match scores are sufficiently high and close to one another.

Upon obtaining a match with at least one 3D gallery object, output 46 may provide an alert to a user of the PC server 20 and/or to a relevant person such as, for example, a security guard 19, who may take steps to contact and/or apprehend the subject of the match within the building 1. The alert sent to the security guard 19 (or other person) may include an image as captured by the cameras 11-15 and/or one or more corresponding image from the gallery 44, thus enabling the security guard 19 to make a final manual confirmation of identity. Images as captured by the cameras 11-15 and sent to the security guard 19 (or other person) may comprise not only captured facial images, but images that give a fuller picture of the person of interest—for example, showing at least some of the clothes that the person is wearing, for easier identification of that person within the building 1. Such fuller picture images may be stored in the system for a predetermined time—e.g. by way of images streamed from the cameras 11-15. Thus, a security guard 19 (or other person) may be able to see a plurality of captured images together with a plurality of gallery images.

Processor 41 may optionally be dispensed with such that all images from processors 34 are passed through to processor 42. For example, in diverse viewpoint camera setups, only one viewpoint may be able to generate good canonical pose images and therefore no other selection between cameras is necessary.

Processors 42, 43, data stores 44, 45 and output device 46 may be provided and/or controlled by PC server 20.

Preferably, processors 31 can detect and track multiple faces in the same image stream. It is not necessary for the processors 31 of different cameras 11-15 to communicate with one another. They provide independent streams of data, and data is self-selecting in the sense that the processors 31 can only function correctly for one (or maybe two) of the cameras 11-15 at any given time. Thus, if camera 13 is getting a frontal view of a face, its processor 31 will find the face and track it, whereas camera 15 will get a side view and the detector fails. If the subject then changes head pose gradually from camera 13 to camera 15, then camera 14 will get the frontal view and track, then after that camera 15. It is possible that, if adjacent views are not too dissimilar from each other, two cameras could detect and track simultaneously for a short time, but they will be treated as separate entities, and if they are both good quality they both will be sent to the 'recogniser' processor 43. In the recogniser 43, it is obvious when it is seeing two views of the same face, as the detection IDs will end up being substantially the same. The recogniser 43 should identify the same person from gallery 44 for both viewpoint tracks. Captured images from both viewpoint tracks could be sent to the security guard 19 (or other person), or one or more captured image from just one viewpoint track could be sent, particularly if the respective match is somewhat better than the other.

The building entrance 2 is an area through which people 5 travel in a common direction, as they enter the building 1. Thus, it provides a good scene location for viewing by the cameras 11-15. Other good scene locations where people can be expected to travel in a common direction include the tops and bottom of staircases and escalators, corridors, lift (elevator) doors, or doorways generally.

As an alternative (or addition, depending upon circumstances) to simple selection of images from the processors 34, images from two or more of the cameras 11-15 may be combined and processed to synthesise a canonical viewpoint image from the different viewpoints of the respective cameras, such that the reconstructed canonical viewpoint matches the viewpoint of the gallery images. For example, suppose that the face of a subject is pointing towards central camera 13, but is obscured from that camera by another person, and yet the two cameras either side of this, cameras 12 and 14, pick up partial views of the left and right sides of the face. These two partial views can then be processed to reconstruct the canonical (e.g. frontal) view, which is then passed to the recogniser 43 to match against the stored images in the gallery 44, with the same canonical viewpoint. Techniques for synthesising one view from other views are known in the art.

In general, in the present context, a 'canonical' view is a standard viewpoint at which the system performs recognition. It is the viewpoint used for images stored in the gallery 44. It is typically the frontal view because there tends to be more discriminative information in that view and security personnel are used to manually checking that view. However, other views or viewpoints are possible. For example, the police store a side view in mugshots. The illustrated system and methods may be adapted to store and detect multiple canonical views—that is, there may be more than one canonical viewpoint.

The PC server 18 (or other processor) may be arranged or configured to evaluate performance of the cameras 11-15, in the sense of relating quality of images received to environmental variables and/or camera settings. Light meters within the building 1 may indicate light levels at the times that images are captured. A control loop incorporating the PC server 18 or other processor may enable manual or automatic adjustment of camera settings (exposure, illumination, etc) to optimise image quality.

Thus, there may be provided a 3D object recognition system and method that can be implemented relatively cheaply and provide fast recognition of known objects. They are particularly suited to the recognition of 3D human faces. They may be relatively cheap because image capture may be effected by using a plurality of relatively cheap 2D cameras with overlapping fields of view, rather than relying upon an expensive camera with complicated control and image processing. The 2D cameras need not have powered mechanical zoom, pan and/or tilt functions, for example, thereby saving on expense. They may be of fixed focus. They are preferably in fixed physical positions and, for economy, they may be designed not to pan or tilt, other than by manual adjustment at their positions. Using multiple 2D cameras helps to avoid complete occlusion of an object by moving agents such as, for example, people, animals and vehicles. It is to be noted that, whereas it is known to use multiple cameras to form 3D or stereo images, the above-described system and method rely only upon 2D images, the processing of which may be much quicker and cheaper.

Any number of 2D cameras may be provided—provided that there are at least two. Preferably, at least three, four or five 2D cameras are provided. In the illustrated example, cameras 12, 13 and 14 are located between end cameras 11, 15, camera 13 being located substantially centrally between end cameras 11, 15. Although, for ease of illustration, cameras 11-15 are shown as mounted on a common rig, they may be individually mounted at suitable positions within the building 1. They may be at least partly disguised or concealed within furniture, fixtures or other objects within the building, so that they are not readily visible to people 5 within the scene.

By incorporating at least part of the intelligence of the system into the camera units, a first stage of selection may be carried out in each of the cameras 11-15, thus reducing to a manageable rate real-time dataflow into PC server 20 that affords central feature extraction (42) and recognition (43) with reference to gallery subjects (44) and sensitivity threshold (45) to provide output (46). To further manage processing requirements and dataflow, the PC server 20 may apply selection as to which of the data streams from cameras 11-15 are to be used at any given time, or it may just accept all of the images that are passed from the individual processors 34.

In this specification, the verb "comprise" has its normal dictionary meaning, to denote non-exclusive inclusion. That is, use of the word "comprise" (or any of its derivatives) to include one feature or more, does not exclude the possibility of also including further features. The word "preferable" (or any of its derivatives) indicates one feature or more that is preferred but not essential.

All or any of the features disclosed in this specification (including any accompanying claims, abstract and drawings), and/or all or any of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of recognising a 3D object at a scene, comprising the steps of:
   providing an array of cameras that are spaced horizontally from one another such that the cameras provide multiple viewpoints of a scene with overlapping fields of view;
   for each of the cameras, generating a sequence of images of a 3D object at the scene, normalising each of those images to a canonical view that is the same canonical view for each of the cameras, selecting one or more best normalised image for that camera and passing the or each selected image to a feature extraction processor;
   extracting feature data from each of the selected images using a feature extraction processor;
   comparing the extracted feature data of each of the selected images with stored, corresponding feature data of known 3D objects using a recognition processor; and
   outputting a recognition result when the extracted feature data of at least one of the selected images corresponds to stored, corresponding feature data of at least one of the known 3D objects.

2. A method according to claim 1 wherein, for each camera, an image is passed to the feature extraction processor only if that image is better than a predetermined threshold.

3. A method according to claim 1, comprising the further step of receiving all selected images from all of the cameras and carrying out a further selection from those images to select one or more best normalised image that is passed to the feature extraction processor.

4. A method according to claim 1, wherein the cameras are disposed at one side of the scene.

5. A method according to claim 1, wherein the cameras surround the scene.

6. A method according to claim 1, wherein the cameras are arranged in an arc as seen in plan view.

7. A method according to claim 1, wherein the scene has a floor and camera apertures are located at a height above the floor that is in a range 1.5 to 2.5 metres or 3 to 4 metres.

8. A method according to claim 1, wherein the scene has a floor and camera apertures are located at a height above the floor that is less than 5 metres.

9. A method according to claim 1, wherein a maximum distance between any two cameras of the array is at least 2 metres.

10. A method according to claim 1, wherein the array of cameras comprises at least three, four or five cameras.

11. A method according to claim 1, wherein the scene is at a location where people travel in a common direction.

12. A method according to claim 1, wherein the 3D object to be recognised is a human subject.

13. A method according claim 12, wherein the 3D object to be recognised is a human face.

14. A method according to claim 1, wherein said canonical view is a frontal view.

15. A method according to claim 1, wherein the cameras are 2D cameras.

16. A method according to claim 1, wherein the step of normalising images to a canonical view comprises synthesising a canonical viewpoint image from images of different viewpoints from different ones of the cameras.

17. A system for use in a method according to claim 1, the system including the array of cameras that are spaced from one another such that the cameras provide multiple viewpoints of the scene with overlapping fields of view; for each of the cameras, means for generating a sequence of images of the object, normalising each of those images to a canonical view and selecting at least one best normalised image for that camera; the feature extraction processor; the recognition processor; a data store that stores said corresponding feature data of known 3D objects; and an output device to output said recognition result: the system being configured to perform a method according to claim 1.

* * * * *